United States Patent
van der Schaar et al.

(10) Patent No.: US 9,191,457 B2
(45) Date of Patent: Nov. 17, 2015

(54) SYSTEMS, METHODS, AND MEDIA FOR CONTROLLING DELIVERY OF CONTENT

(71) Applicant: Sonic IP, Inc., Santa Clara, CA (US)

(72) Inventors: Auke Sjoerd van der Schaar, Los Angeles, CA (US); Abhishek Shivadas, San Diego, CA (US)

(73) Assignee: Sonic IP, Inc., San Diego, CA (US)

( * ) Notice: Subject to any disclaimer, the term of this patent is extended or adjusted under 35 U.S.C. 154(b) by 286 days.

(21) Appl. No.: 13/732,140

(22) Filed: Dec. 31, 2012

(65) Prior Publication Data

US 2014/0189065 A1    Jul. 3, 2014

(51) Int. Cl.
| | |
|---|---|
| *H04N 21/45* | (2011.01) |
| *H04L 29/08* | (2006.01) |
| *H04L 29/06* | (2006.01) |
| *H04N 21/442* | (2011.01) |
| *H04N 21/637* | (2011.01) |
| *H04N 21/845* | (2011.01) |
| *H04N 21/854* | (2011.01) |

(52) U.S. Cl.
CPC ............... *H04L 67/32* (2013.01); *H04L 65/00* (2013.01); *H04N 21/44209* (2013.01); *H04N 21/637* (2013.01); *H04N 21/8456* (2013.01); *H04N 21/85406* (2013.01)

(58) Field of Classification Search
CPC . H04L 65/608; H04L 65/4084; H04L 65/604; H04L 65/60; H04L 67/2833; H04L 29/06027; H04L 67/32; H04L 65/00; H04N 21/6437; H04N 21/47202; H04N 21/44209; H04N 21/637; H04N 21/8456; H04N 21/85406
See application file for complete search history.

(56) References Cited

U.S. PATENT DOCUMENTS

| | | | |
|---|---|---|---|
| 5,361,332 A | 11/1994 | Yoshida et al. | |
| 5,404,436 A | 4/1995 | Hamilton | |
| 6,031,622 A | 2/2000 | Ristow et al. | |
| 6,195,388 B1 | 2/2001 | Choi et al. | |

(Continued)

FOREIGN PATENT DOCUMENTS

| | | |
|---|---|---|
| EP | 813167 A2 | 12/1997 |
| WO | 2004102571 A1 | 11/2004 |

(Continued)

OTHER PUBLICATIONS

Dominik Kaspar et al., "Using HTTP Pipelining to Improve Progressive Download over Multiple Heterogeneous Interfaces", 2010, IEE ICC proceedings.*

(Continued)

*Primary Examiner* — Brian J Gillis
*Assistant Examiner* — Matthew Ballard
(74) *Attorney, Agent, or Firm* — KPPB LLP

(57) ABSTRACT

Methods, systems, and computer readable media for controlling delivery of content are provided. In some embodiments, a system for controlling delivery of content is provided. The system includes processing circuitry configured to: transmit, to a server, a plurality of requests for blocks of the content; while at least some of the plurality of requests are still outstanding: detect a change of a service characteristic of a connection between the system and the server; determine a preferred number of outstanding requests; and cancel at least some of the requests from the plurality that are still outstanding based on the preferred number and a count of the requests from the plurality that are still outstanding.

6 Claims, 9 Drawing Sheets

(56) References Cited

U.S. PATENT DOCUMENTS

| | | |
|---|---|---|
| 6,658,056 B1 | 12/2003 | Duruöz et al. |
| 6,807,306 B1 | 10/2004 | Girgensohn et al. |
| 6,859,496 B1 | 2/2005 | Boroczky et al. |
| 6,956,901 B2 | 10/2005 | Boroczky et al. |
| 7,242,772 B1 | 7/2007 | Tehranchi |
| 7,478,325 B2 | 1/2009 | Foehr |
| 8,023,562 B2 | 9/2011 | Zheludkov et al. |
| 8,046,453 B2 | 10/2011 | Olaiya |
| 8,054,880 B2 | 11/2011 | Yu et al. |
| 8,225,061 B2 | 7/2012 | Greenebaum |
| 8,233,768 B2 | 7/2012 | Soroushian et al. |
| 8,249,168 B2 | 8/2012 | Graves |
| 8,270,473 B2 | 9/2012 | Chen et al. |
| 8,270,819 B2 | 9/2012 | Vannier |
| 8,289,338 B2 | 10/2012 | Priyadarshi et al. |
| 8,311,115 B2 | 11/2012 | Gu et al. |
| 8,321,556 B1 | 11/2012 | Chatterjee et al. |
| 8,386,621 B2 | 2/2013 | Park |
| 8,456,380 B2 | 6/2013 | Pagan |
| 8,472,792 B2 | 6/2013 | Butt |
| 8,914,534 B2 | 12/2014 | Braness et al. |
| 2003/0002578 A1 | 1/2003 | Tsukagoshi et al. |
| 2003/0152370 A1 | 8/2003 | Otomo et al. |
| 2003/0231863 A1 | 12/2003 | Eerenberg et al. |
| 2003/0231867 A1 | 12/2003 | Gates et al. |
| 2003/0236836 A1 | 12/2003 | Borthwick |
| 2004/0136698 A1 | 7/2004 | Mock |
| 2005/0038826 A1 | 2/2005 | Bae et al. |
| 2005/0193070 A1 | 9/2005 | Brown et al. |
| 2005/0193322 A1 | 9/2005 | Lamkin et al. |
| 2005/0207442 A1 | 9/2005 | Zoest et al. |
| 2005/0207578 A1 | 9/2005 | Matsuyama et al. |
| 2005/0273695 A1 | 12/2005 | Schnurr |
| 2005/0275656 A1 | 12/2005 | Corbin et al. |
| 2006/0078301 A1 | 4/2006 | Ikeda et al. |
| 2006/0129909 A1 | 6/2006 | Butt et al. |
| 2006/0173887 A1 | 8/2006 | Breitfeld et al. |
| 2006/0245727 A1 | 11/2006 | Nakano et al. |
| 2006/0259588 A1 | 11/2006 | Lerman et al. |
| 2006/0263056 A1 | 11/2006 | Lin et al. |
| 2007/0031110 A1 | 2/2007 | Rijckaert |
| 2007/0047901 A1 | 3/2007 | Ando et al. |
| 2007/0083617 A1 | 4/2007 | Chakrabarti et al. |
| 2007/0086528 A1 | 4/2007 | Mauchly et al. |
| 2007/0140647 A1 | 6/2007 | Kusunoki et al. |
| 2007/0154165 A1 | 7/2007 | Hemmeryckx-Deleersnijder et al. |
| 2007/0168541 A1 | 7/2007 | Gupta et al. |
| 2007/0180125 A1 | 8/2007 | Knowles et al. |
| 2007/0239839 A1 | 10/2007 | Buday et al. |
| 2007/0292107 A1 | 12/2007 | Yahata et al. |
| 2008/0101466 A1 | 5/2008 | Swenson et al. |
| 2008/0126248 A1 | 5/2008 | Lee et al. |
| 2008/0137736 A1 | 6/2008 | Richardson et al. |
| 2008/0192818 A1 | 8/2008 | DiPietro et al. |
| 2008/0240144 A1* | 10/2008 | Kruse et al. ................. 370/449 |
| 2008/0256105 A1 | 10/2008 | Nogawa et al. |
| 2008/0263354 A1 | 10/2008 | Beuque et al. |
| 2008/0279535 A1 | 11/2008 | Haque et al. |
| 2008/0310496 A1 | 12/2008 | Fang |
| 2009/0031220 A1 | 1/2009 | Tranchant et al. |
| 2009/0037959 A1 | 2/2009 | Suh et al. |
| 2009/0060452 A1 | 3/2009 | Chaudhri |
| 2009/0066839 A1 | 3/2009 | Jung et al. |
| 2009/0132599 A1 | 5/2009 | Soroushian et al. |
| 2009/0132721 A1 | 5/2009 | Soroushian et al. |
| 2009/0150557 A1 | 6/2009 | Wormley et al. |
| 2009/0169181 A1 | 7/2009 | Priyadarshi et al. |
| 2009/0201988 A1 | 8/2009 | Gazier et al. |
| 2009/0226148 A1 | 9/2009 | Nesvadba et al. |
| 2009/0293116 A1 | 11/2009 | DeMello |
| 2009/0303241 A1 | 12/2009 | Priyadarshi et al. |
| 2009/0307258 A1 | 12/2009 | Priyadarshi et al. |
| 2009/0307267 A1 | 12/2009 | Chen et al. |
| 2009/0313544 A1 | 12/2009 | Wood et al. |
| 2009/0313564 A1 | 12/2009 | Rottler et al. |
| 2009/0328124 A1 | 12/2009 | Khouzam et al. |
| 2010/0040351 A1 | 2/2010 | Toma et al. |
| 2010/0094969 A1 | 4/2010 | Zuckerman et al. |
| 2010/0095121 A1 | 4/2010 | Shetty et al. |
| 2010/0111192 A1 | 5/2010 | Graves |
| 2010/0158109 A1 | 6/2010 | Dahlby et al. |
| 2010/0189183 A1 | 7/2010 | Gu et al. |
| 2010/0228795 A1 | 9/2010 | Hahn |
| 2011/0080940 A1 | 4/2011 | Bocharov |
| 2011/0126191 A1 | 5/2011 | Hughes et al. |
| 2011/0129011 A1 | 6/2011 | Cilli et al. |
| 2011/0142415 A1 | 6/2011 | Rhyu |
| 2011/0150100 A1 | 6/2011 | Abadir |
| 2011/0153785 A1 | 6/2011 | Minborg et al. |
| 2011/0213827 A1* | 9/2011 | Kaspar et al. ................. 709/203 |
| 2011/0239078 A1 | 9/2011 | Luby et al. |
| 2011/0246659 A1 | 10/2011 | Bouazizi |
| 2011/0268178 A1 | 11/2011 | Park |
| 2011/0302319 A1 | 12/2011 | Ha et al. |
| 2011/0305273 A1 | 12/2011 | He et al. |
| 2011/0314176 A1 | 12/2011 | Frojdh et al. |
| 2011/0314500 A1 | 12/2011 | Gordon et al. |
| 2012/0023251 A1 | 1/2012 | Pyle et al. |
| 2012/0093214 A1 | 4/2012 | Urbach |
| 2012/0170642 A1 | 7/2012 | Braness et al. |
| 2012/0170643 A1 | 7/2012 | Soroushian et al. |
| 2012/0170906 A1 | 7/2012 | Soroushian et al. |
| 2012/0170915 A1 | 7/2012 | Braness et al. |
| 2012/0173751 A1 | 7/2012 | Braness et al. |
| 2012/0278496 A1 | 11/2012 | Hsu |
| 2012/0307883 A1 | 12/2012 | Graves |
| 2013/0044821 A1 | 2/2013 | Braness et al. |
| 2013/0046902 A1 | 2/2013 | Villegas Nuñez et al. |
| 2013/0061045 A1 | 3/2013 | Kiefer et al. |

FOREIGN PATENT DOCUMENTS

| | | |
|---|---|---|
| WO | 2009065137 A1 | 5/2009 |
| WO | 2010060106 A1 | 5/2010 |
| WO | 2010122447 A1 | 10/2010 |
| WO | 2012/094181 A2 | 7/2012 |
| WO | 2012/094189 A1 | 7/2012 |
| WO | 2012094171 A1 | 7/2012 |

OTHER PUBLICATIONS

"Supported Media Formats", Supported Media Formats, Android Developers, Nov. 27, 2013, 3 pgs.
European Search Report for Application 11855237.1, search completed Jun. 12, 2014, 9 pgs.
Federal Computer Week, "Tool Speeds Info to Vehicles", Jul. 25, 1999, 5 pages.
HTTP Live Streaming Overview, Networking & Internet, Apple, Inc., Apr. 1, 2011, 38 pages.
Informationweek: Front End: Daily Dose, "Internet on Wheels", Jul. 20, 1999, 3 pgs.
International Search Report and Written Opinion for International Application PCT/US2011/066927, International Filing Date Dec. 22, 2011, Report Completed Apr. 3, 2012, Mailed Apr. 20, 2012, 14 pgs.
International Search Report and Written Opinion for International Application PCT/US2011/067167, International Filing Date Dec. 23, 2011, Report Completed Jun. 19, 2012, Mailed Jul. 2, 2012, 11 pgs.
ITS International, "Fleet System Opts for Mobile Server", Aug. 26, 1999, 1 page.
Microsoft, Microsoft Media Platform: Player Framework, "Silverlight Media Framework v1.1", 2 pages.
Microsoft, Microsoft Media Platform:Player Framework, "Microsoft Media Platform: Player Framework v2.5 (formerly Silverlight Media Framework)", 2 pages.
The Official Microsoft IIS Site, Smooth Streaming Client, 4 pages.
"Adaptive Streaming Comparison", Jan. 28, 2010, 5 pgs.
"Best Practices for Multi-Device Transcoding", Kaltura Open Source Video, 13 pgs.

(56) References Cited

OTHER PUBLICATIONS

"Netflix turns on subtitles for PC, Mac streaming", 3 pgs.
"Thread: SSME (Smooth Streaming Medial Element) config.xml review (Smooth Streaming Client configuration file)", 3 pgs.
"Transcoding Best Practices", From movideo, Nov. 27, 2013, 5 pgs.
"Using HTTP Live Streaming", iOS Developer Library, Retrieved from: http://developer.apple.com/library/ios/#documentation/networkinginternet/conceptual/streamingmediaguide/UsingHTTPLiveStreaming/UsingHTTPLiveStreaming.html#//apple_ref/doc/uid/TP40008332-CH102-SW1, 10 pgs.
Akhshabi et al., "An Experimental Evaluation of Rate-Adaptation Algorithms in Adaptive Streaming over HTTP", MMSys'11, Feb. 24-25, 2011, 12 pgs.
"Method for the encoding of a compressed video sequence derived from the same video sequence compressed at a different bit rate without loss of data", ip.com, ip.com No. IPCOM000008165D, May 22, 2012, pp. 1-9.
Deutscher, "IIS Transform Manager Beta—Using the MP4 to Smooth Task", Retrieved from: https://web.archive.org/web/20130328111303/http://blog.johndeutscher.com/category/smooth-streaming, Blog post of Apr. 17, 2010, 14 pgs.
Gannes, "The Lowdown on Apple's HTTP Adaptive Bitrate Streaming", GigaOM, Jun. 10, 2009, 12 pgs.
Ghosh, "Enhancing Silverlight Video Experiences with Contextual Data", Retrieved from: http://msdn.microsoft.com/en-us/magazine/ee336025.aspx, 15 pgs.
Inlet Technologies, "Adaptive Delivery to iDevices", 2 pages.
Inlet Technologies, "Adaptive delivery to iPhone 3.0", 2 pgs.
Inlet Technologies, "HTTP versus RTMP", 3 pages.
Inlet Technologies, "The World's First Live Smooth Streaming Event: The French Open", 2 pages.
Kurzke et al., "Get Your Content Onto Google TV", Google, Retrieved from: http://commondatastorage.googleapis.com/io2012/presentations/live%20to%20website/1300.pdf, 58 pgs.
Lang, "Expression Encoder, Best Practices for live smooth streaming broadcasting", Microsoft Corporation, 20 pgs.
Levkov, "Mobile Encoding Guidelines for Android Powered Devices", Adobe Systems Inc., Addendum B, source and date unknown, 42 pgs.
MSDN, "Adaptive streaming, Expression Studio 2.0", 2 pgs.
Nelson, "Smooth Streaming Deployment Guide", Microsoft Expression Encoder, Aug. 2010, 66 pgs.
Noé, Alexander, Matroska File Format (under construction Jun. 24, 2007, XP002617671, Retrieved from: http://web.archive.org/web/20070821155146/www.matroska.org/technical/specs/matroska.pdf, Retrieved on Jan. 19, 2011, pp. 1-51.
Ozer, "The 2012 Encoding and Transcoding Buyers' Guide", Streamingmedia.com, Retrieved from: http://www.streamingmedia.com/Articles/Editorial/Featured-Articles/The-2012-Encoding-and-Transcoding-Buyers-Guide-84210.aspx, 2012, 8 pgs.
Pantos, "HTTP Live Streaming, draft-pantos-http-live-streaming-10", IETF Tools, Oct. 15, 2012, Retrieved from: http://tools.ietf.org/html/draft-pantos-http-live-streaming-10, 37 pgs.
RGB Networks, "Comparing Adaptive HTTP Streaming Technologies", Nov. 2011, Retrieved from: http://btreport.net/wp-content/uploads/2012/02/RGB-Adaptive-HTTP-Streaming-Comparison-1211-01.pdf, 20 pgs.
Siglin, "HTTP Streaming: What You Need to Know", streamingmedia.com, 2010, 15 pages.
Siglin, "Unifying Global Video Strategies, MP4 File Fragmentation for Broadcast, Mobile and Web Delivery", Nov. 16, 2011, 16 pgs.
Zambelli, Alex "IIS Smooth Streaming Technical Overview", Microsoft Corporation, Mar. 2009.

* cited by examiner

SYSTEMS, METHODS, AND MEDIA FOR CONTROLLING DELIVERY OF CONTENT

BACKGROUND OF THE INVENTION

Consumers of media content, such as movies, television programs, and short videos, are increasingly streaming media content over the Internet to client devices, such as laptops, smart TVs, and streaming media players. Typically, when online streaming is used, media content is constantly received in blocks and rendered on the client devices as the blocks are received. Online streaming may thus generate a higher bandwidth usage than other online activities.

When performed inefficiently, online streaming may waste network resources. For instance, network infrastructure may be under-utilized in situations where blocks of streamed content are requested one-by-one. In such situations, a client device may transmit a first request, receive a response, and transmit a second request only after the response to the first request is received. Streaming content in this manner may result in a network throughput that is below the network's bandwidth.

SUMMARY OF THE INVENTION

In some embodiments, a system for controlling delivery of content is provided. The system includes processing circuitry configured to: transmit, to a server, a plurality of requests for blocks of the content; while at least some of the plurality of requests are still outstanding: detect a change of a service characteristic of a connection between the system and the server; determine a preferred number of outstanding requests; and cancel at least some of the requests from the plurality that are still outstanding based on the preferred number and a count of the requests from the plurality that are still outstanding.

In some embodiments, a system for presenting media content using cached assets is provided. The system includes processing circuitry configured to: transmit to a server a plurality of requests for blocks of a content, the plurality including a first request for a first block of the content and a second request for a second block of the content; while the second request is still outstanding: receive a first block of the content responsive to the first request; determine a preferred number of outstanding requests; and when the preferred number of outstanding requests is greater than the number of requests from the plurality that are currently outstanding, transmit a third request for a third block before the second block is received by the processing circuitry; otherwise, when the preferred number of outstanding requests is less than or equal to the number of requests from the plurality that are currently outstanding, transmit the third request after the second block is received by the processing circuitry.

In some embodiments, a method for controlling delivery of content is provided, the method comprising: transmitting a plurality of requests for blocks of the content to a server; while at least some of the plurality of requests are still outstanding: detecting a change of a service characteristic of a connection with a server; determining, by a processing circuitry, a preferred number of outstanding requests; and cancelling at least some of the requests from the plurality that are still outstanding based on the preferred number and a count of the requests from the plurality that are still outstanding.

In some embodiments, a method for controlling delivery of content is provided, the method comprising: transmitting, by a device to a server, a plurality of requests for blocks of a content, the plurality including a first request for a first block of the content and a second request for a second block of the content; while the second request is still outstanding: receiving a first block of the content responsive to the first request; determining a preferred number of outstanding requests; and when the preferred number of outstanding requests is greater than the number of requests from the plurality that are currently outstanding, transmitting a third request for a third block of the content before the second block is received at the device; otherwise, when the preferred number of outstanding requests is less than or equal to the number of requests from the plurality that are currently outstanding, transmitting the third request after the second block is received at the device.

In some embodiments, a non-transitory computer-readable medium is provided that contains computer-executable instructions. The computer-executable instructions, when executed by a processing circuitry, cause the processing circuitry to perform a method for controlling delivery of content, the method comprising: transmitting a plurality of requests for blocks of the content to a server; while at least some of the plurality of requests are still outstanding: detecting a change of a service characteristic of a connection with a server; determining a preferred number of outstanding requests; and cancelling at least some of the requests from the plurality that are still outstanding based on the preferred number and a count of the requests from the plurality that are still outstanding.

In some embodiments, a non-transitory computer-readable medium is provided that contains computer-executable instructions. The computer-executable instructions, when executed by a processing circuitry, cause the processing circuitry to perform a method for controlling delivery of content, the method comprising: transmitting to a server a plurality of requests for blocks of a content, the plurality including a first request for a first block of the content and a second request for a second block of the content; while the second request is still outstanding, receiving a first block of the content responsive to the first request; determining a preferred number of outstanding requests; and when the preferred number of outstanding requests is greater than the number of requests from the plurality that are currently outstanding, transmitting a third request for a third block of the content before the second block is received at the device; when the preferred number of outstanding requests is less than or equal to the number of requests from the plurality that are currently outstanding, transmitting the third request after the second block is received at the device.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION OF EMBODIMENTS

This invention generally relates to systems, methods, and media for controlling delivery of content. In some embodiments, a technique for controlling delivery content is provided. In accordance with the technique, multiple requests for blocks of the streamed content may be issued simultaneously, or nearly simultaneously, by a client device without waiting for the receipt of a response to any of the requests. The requests may be received at a server and served in the order of their arrival. Requests that have been transmitted by the client, but for which a response has not been received may be referred to as outstanding requests.

In some embodiments, the number of outstanding requests may be dynamically increased in dependence upon predetermined criterion/or criteria. Furthermore, in some embodiments, the number of outstanding request may be dynamically reduced in response to predetermined criterion/or criteria. The number of outstanding requests may be reduced by cancelling some of the outstanding requests. Dynamically reducing and/or increasing the number of outstanding requests may enable the systems, methods, and media to react to unexpected events, such as increase/decrease of available network bandwidth leading to the occurrence of underflow conditions, and/or any other suitable event.

As referred to herein, the term "media content" or "content" should be understood to mean one or more electronically consumable media assets, such as television programs, pay-per-view programs, on-demand programs (e.g., as provided in video-on-demand (VOD) systems), Internet content (e.g., streaming content, downloadable content, Webcasts, etc.), movies, films, video clips, audio, audio books, and/or any other media or multimedia and/or combination of the same. As referred to herein, the term "multimedia" should be understood to mean media content that utilizes at least two different content forms described above, for example, text, audio, images, video, or interactivity content forms. Media content may be recorded, played, displayed or accessed by user equipment devices, but can also be part of a live performance. In some embodiments, media content can include over-the-top (OTT) content. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC.

Media content can be provided from any suitable source in some embodiments. In some embodiments, media content can be electronically delivered to a user's location from a remote location. For example, media content, such as a Video-On-Demand movie, can be delivered to a user's home from a cable system server. As another example, media content, such as a television program, can be delivered to a user's home from a streaming media provider over the Internet.

Figure 1:
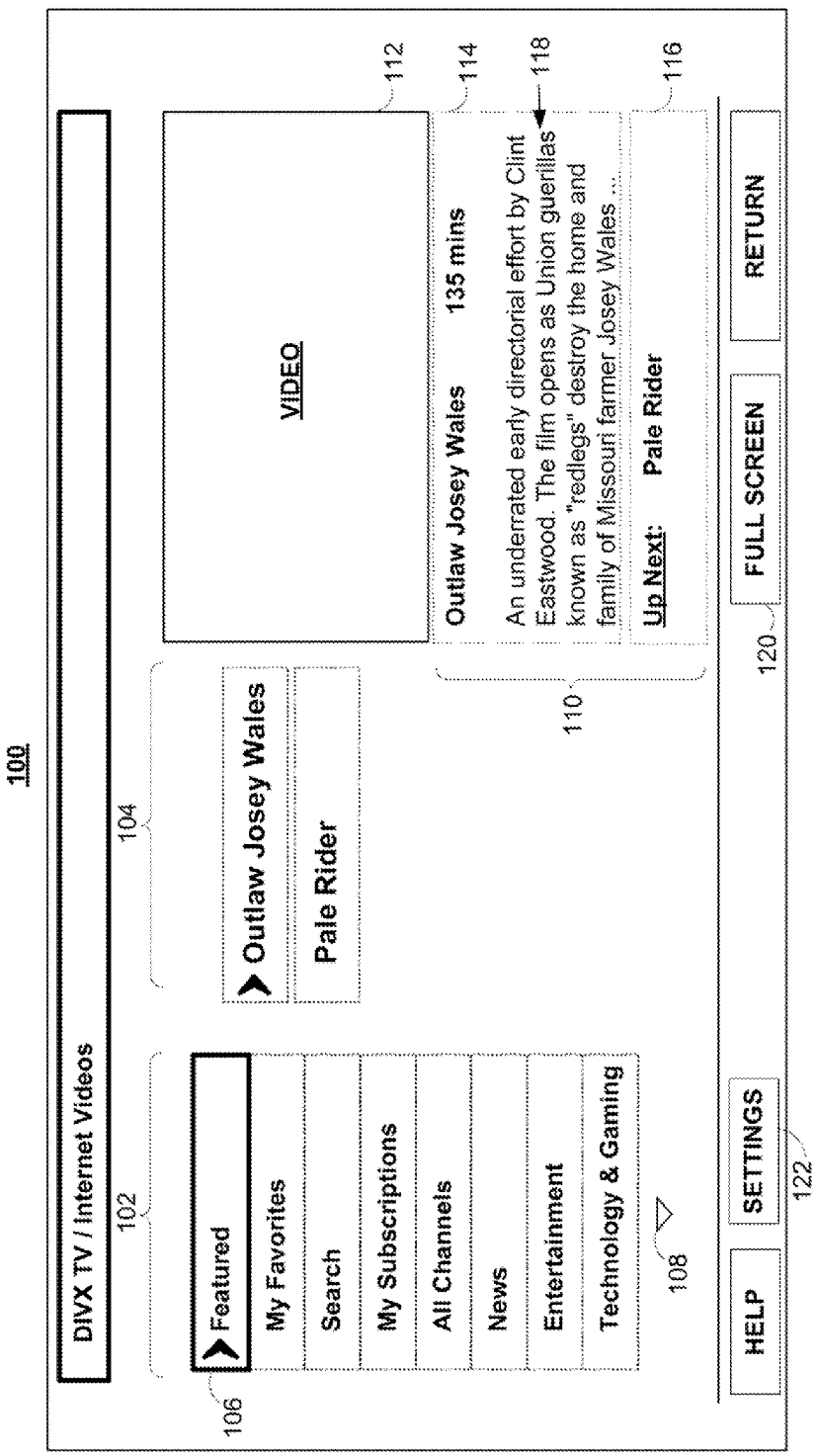
FIG. 1 shows an example of an interactive media guidance application display that can be used with a process for selecting media content for presentation in accordance with some embodiments of the invention.

FIG. 1 shows an example 100 of a guidance display that can be provided as part of an interactive media guidance application in accordance with some embodiments. As illustrated, a user may be presented with display 100 in response to the user selecting a selectable option provided in a displayed menu (e.g., an "Internet Videos" option, a "DivXTV" option, a "Program Listings" option, etc.), pressing a dedicated button (e.g., a GUIDE button) on a user input interface or device, and/or taking any other suitable action.

As illustrated in FIG. 1, guidance display 100 may include lists of media identifiers, such as a first list of media identifiers 102 that lists categories of media content, and a second list of media identifiers 104 that lists particular pieces of media content within a selected category that are available for presentation.

Additional media guidance data, such as additional media identifiers, may be presented in response to a user selecting a navigational icon 108.

Display 100 may also include a media queue region 110 that lists one or more pieces of media content selected and queued for playback, and a video region 112 in which pieces of media content can be presented.

In some embodiments, information relating to a piece of media content can also be presented to a user. For example, information 118 can include a name of a piece of media content, a time at which the media content is available (if applicable), a source (e.g., channel, Web address, etc.) from which the media content can be obtained, a parental rating for the piece of media content, a duration of the piece of media content, a description of the piece of media content, a review or a quality rating of the piece of media content, and/or any other suitable information.

In some embodiments, pieces of media content can be played in a full sized display screen in response to a user selecting "full screen" button 120.

In some embodiments, a user may be able to set settings related to the interactive media guidance application by pressing a settings button, such as settings button 122 of FIG. 1. The settings that can be set can include any suitable settings such as channel and program favorites, programming preferences that the guidance application can utilize to make programming recommendations, display preferences, language preferences, and/or any other suitable settings.

Figure 2:
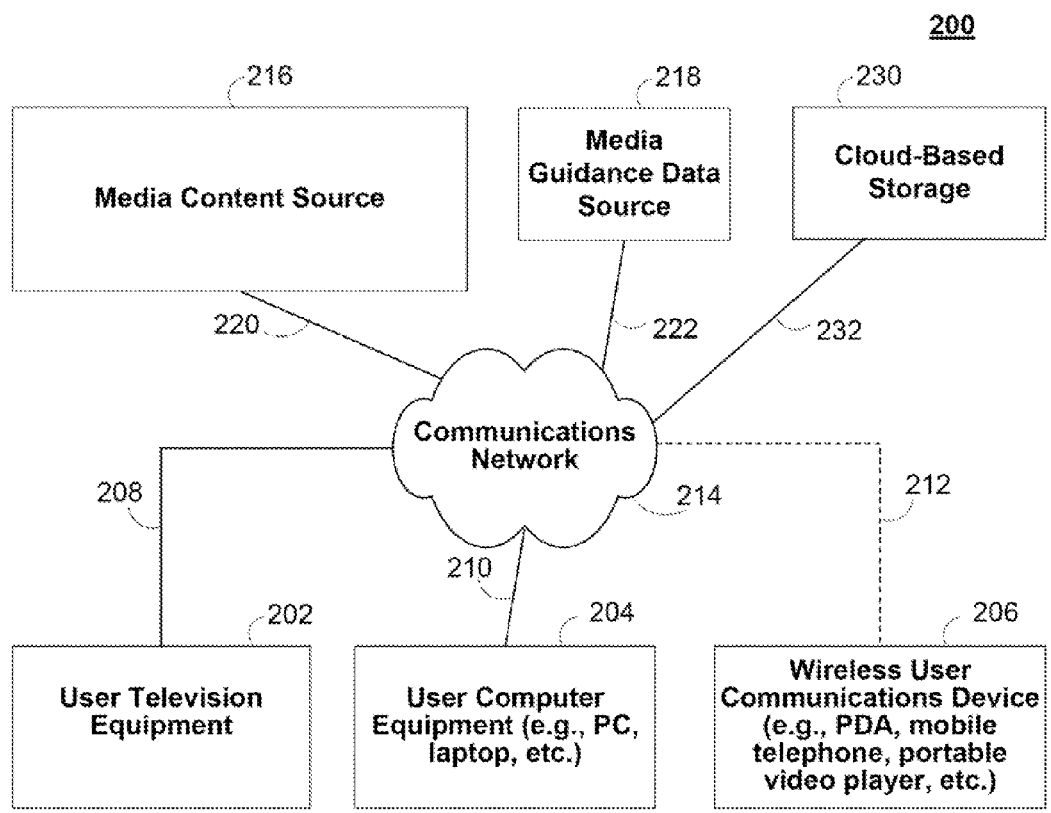
FIG. 2 shows an example of a block diagram of hardware that can be used in accordance with some embodiments of the invention.

Turning to FIG. 2, an example 200 of an architecture of hardware that can be used in accordance with some embodiments is shown. As illustrated, architecture 200 can include a user television equipment device 202, a user computer equipment device 204, a wireless user communication device 206, a communications network 214, a media content source 216, a media guidance data source 218, cloud-based storage 230, and communication paths 208, 210, 212, 220, 222, and 232, in some embodiments.

In some embodiments, user television equipment device 202, user computer equipment device 204, and wireless user communication device 206, which can each be referred to herein as a "user equipment device," can be any suitable devices for presenting media content, presenting an interactive media guidance application for selecting content, and/or performing any other suitable functions as described herein.

User television equipment device 202 can be any suitable user television equipment device or devices in some embodiments. For example, in some embodiments, user television equipment device 202 can include any suitable television, smart TV, set-top box, integrated receiver decoder (IRD) for handling satellite television, digital storage device, digital media receiver (DMR), digital media adapter (DMA), streaming media device, DVD player, DVD recorder, connected DVD, local media server, BLU-RAY player, BLU-RAY recorder, any other suitable user television equipment, and/or any other suitable combination of the same.

User computer equipment 204 can be any suitable user computer equipment in some embodiments. For example, in some embodiments, user computer equipment 204 can include any suitable personal computer (PC), laptop computer, tablet computer, WebTV box, personal computer television (PC/TV), PC media server, PC media center, handheld computer, stationary telephone, non-portable gaming machine, any other suitable user computer equipment, and/or any other suitable combination of the same.

Wireless user communication device 206 can be any suitable wireless user communication device or devices in some embodiments. For example, in some embodiments, wireless user communication device 206 can include any suitable personal digital assistant (PDA), mobile telephone, portable video player, portable music player, portable gaming machine, smart phone, any other suitable wireless device, and/or any suitable combination of the same.

In some embodiments, user equipment devices may be connectable to a communications network. For example, in some embodiments, user equipment devices may be Internet-enabled allowing them to access Internet media content.

In some embodiments, communications network 214 may be any one or more networks including the Internet, a mobile phone network, a mobile voice network, a mobile data network (e.g., a 3G, 4G, or LTE network), a cable network, a satellite network, a public switched telephone network, a local area network, a wide area network, any other suitable type of communications network, and/or any suitable combination of communications networks.

Media content source 216 may include one or more types of content distribution equipment for distributing any suitable media content, including television distribution facility equipment, cable system head-end equipment, satellite distribution facility equipment, programming source equipment (e.g., equipment of television broadcasters, such as NBC, ABC, HBO, etc.), intermediate distribution facility equipment, Internet provider equipment, on-demand media server equipment, and/or any other suitable media content provider equipment, in some embodiments. NBC is a trademark owned by the National Broadcasting Company, Inc., ABC is a trademark owned by the American Broadcasting Companies, Inc., and HBO is a trademark owned by the Home Box Office, Inc.

Media content source 216 may be operated by the originator of content (e.g., a television broadcaster, a Webcast provider, etc.) or may be operated by a party other than the originator of content (e.g., an on-demand content provider, an Internet provider of content of broadcast programs for downloading, etc.), in some embodiments.

Media content source 216 may be operated by cable providers, satellite providers, on-demand providers, Internet providers, providers of over-the-top content, subscription providers, rental providers, and/or any other suitable provider(s) of content, in some embodiments.

Media content source 216 may include a remote media server used to store different types of content (including video content selected by a user), in a location remote from any of the user equipment devices, in some embodiments. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 218 may provide any suitable media guidance data, such as names of pieces of media content, times at which the media content is available (if applicable), sources (e.g., channels, Web addresses, etc.) from which the media content can be obtained, parental ratings for the pieces of media content, durations of the pieces of media content, descriptions of the pieces of media content, reviews or quality ratings of the pieces of media content, and/or any other suitable information, in some embodiments.

Media guidance data may be provided by media guidance data source 218 to the user equipment devices using any suitable approach, in some embodiments. In some embodiments, for example, an interactive media guidance application may be a stand-alone interactive television program guide that receives this media guidance data from media guidance data source 218 via a data feed (e.g., a continuous feed or trickle feed). In some embodiments, this media guidance data may be provided to the user equipment on a television channel sideband, using an in-band digital signal, using an out-of-band digital signal, or by any other suitable data transmission technique from media guidance data source 218. In some embodiments, this media guidance data may be provided to user equipment on multiple analog or digital television channels from media guidance data source 218. In some embodiments, media guidance data from media guidance data source 218 may be provided to users' equipment using a client-server approach, wherein media guidance data source 218 acts as a server.

Cloud-based storage 230 can be any suitable storage for storing any suitable content, data, licenses, etc. so that it is accessible via communication network 214, in some embodiments. In some embodiments, cloud-based storage 230 can be virtualized pools of storage hosted in an Internet data center, such as the Amazon S3 storage provided by Amazon Web Services of Herndon, Va., USA. In some embodiments, cloud-based storage 230 can be used to "locally" cache media content for presentation on user equipment devices 202, 204, and/or 206 rather than store that content in user equipment devices 202, 204, and/or 206.

Although only one each of user equipment devices 202, 204, and/or 206, sources 216 and 218, and storage 230 are illustrated in FIG. 2 in order to avoid over complicating the drawing, any suitable number of each of these components can be provided in some embodiments.

Each user may utilize more than one type of user equipment device in some embodiments. In some embodiments, any of user equipment devices 202, 204, and 206 can be combined, and any of sources 216 and 218 can be combined.

Paths 208, 210, 212, 220, 222, and 232 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths, in some embodiments. Path 212 is drawn with dotted lines to indicate that, in the exemplary embodiment shown in FIG. 2, it can be a wireless path (although this path may be a wired path, if desired), and paths 208, 210, 220, 222, and 232 are drawn as solid lines to indicate they can be wired paths (although these paths may be wireless paths, if desired). In some embodiments, communication to/from user equipment devices 202, 204, and 206, sources 216 and 218, and storage 230 may be provided by one or more of communications paths 208, 210, 212, 220, 222, and 232, respectively, but are shown as a single path in FIG. 2 to avoid overcomplicating the drawing.

Although communications paths are not drawn between user equipment devices 202, 204, and 206, sources 216 and 218, and storage 230, these components may communicate directly with each other via communication paths, such as those described above, as well via point-to-point communication paths, such as USB cables, IEEE 1394 cables, wireless paths (e.g., Bluetooth, infrared, IEEE 802.11x, etc.), or other communication via wired or wireless paths, in some embodiments. BLUETOOTH is a certification mark owned by Bluetooth SIG, INC. The user equipment devices 202, 204, and 206, sources 216 and 218, and storage 230 may also communicate with each other directly through an indirect path via communications network 214, in some embodiments.

In some embodiments, sources 216 and 218 and storage 230 can be implemented in any suitable hardware. For example, sources 216 and 218 and storage 230 can be implemented in any of a general purpose device such as a computer or a special purpose device such as a client, a server, mobile terminal (e.g., mobile phone), etc. Any of these general or special purpose devices can include any suitable components such as a hardware processor (which can be a microprocessor, digital signal processor, a controller, etc.).

Figure 3:
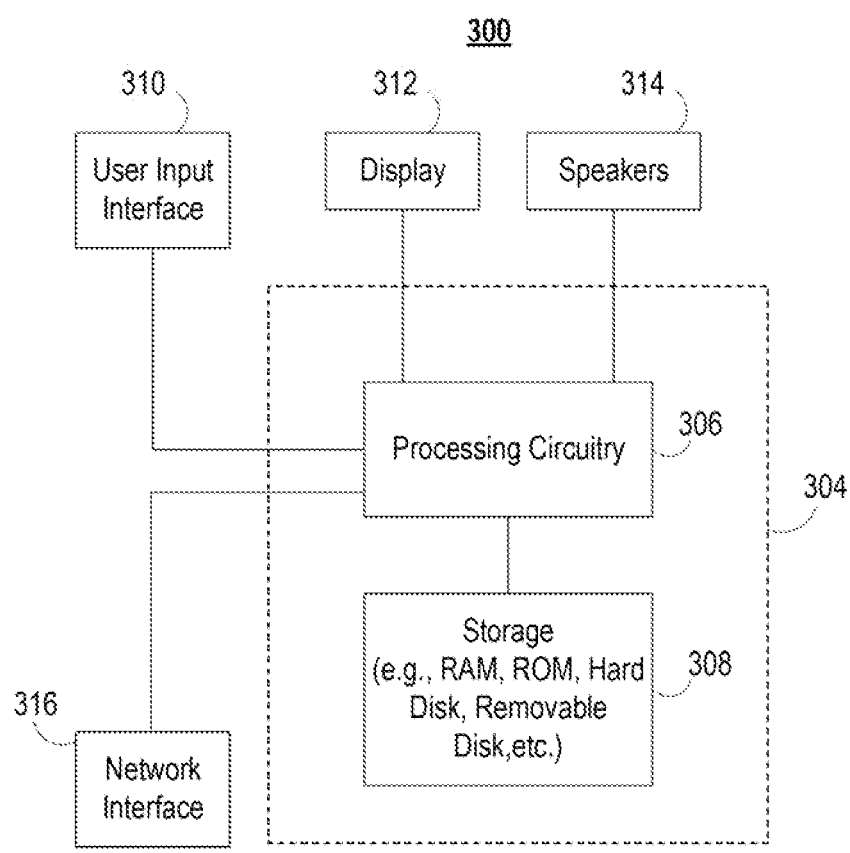
FIG. 3 shows an example of a block diagram of user equipment device hardware that can be used in accordance with some embodiments of the invention.

FIG. 3 shows an example of hardware that can be provided in an illustrative user equipment device 300, such as user television equipment device 202, user computer equipment device 204, and/or wireless user communication device 206 of FIG. 2, in accordance with some embodiments. As illustrated, device 300 can include control circuitry 304 (which can include processing circuitry 306 and storage 308), a user input interface 310, a display 312, speakers 314, and an input/output (hereinafter "I/O") interface 316, in some embodiments.

Control circuitry 304 may include any suitable processing circuitry such as processing circuitry 306. As referred to herein, processing circuitry 306 can be circuitry that includes one or more microprocessors, microcontrollers, digital signal processors, programmable logic devices, field-programmable gate arrays (FPGAs), application-specific integrated circuits (ASICs), hardware processors, etc., and may include a multi-core processor (e.g., dual-core, quad-core, hexa-core, or any suitable number of cores) or a supercomputer, in some embodiments. In some embodiments, processing circuitry may be distributed across multiple separate processors or processing units, such as, for example, multiple of the same type of processing units (e.g., two Intel Core i7 processors) or multiple different processors (e.g., an Intel Core i5 processor and an Intel Core i7 processor).

Storage 308 can be any suitable digital storage mechanism in some embodiments. For example, storage 308 can include any device for storing electronic data, program instructions, computer software, firmware, register values, etc., such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store media content, media guidance data, executable instructions (e.g., programs, software, scripts, etc.) for providing an interactive media guidance application, and for any other suitable functions, and/or any other suitable data or program code, in accordance with some embodiments. Nonvolatile memory may also be used (e.g., to launch a boot-up routine and other instructions), in some embodiments. Cloud-based storage may be used to supplement storage 308 or instead of storage 308 in some embodiments.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits, in some embodiments. Encoding circuitry (e.g., for converting over-the-air, analog, or digital signals to MPEG signals for storage) may also be provided, in some embodiments. Control circuitry 304 may also include scaler circuitry for upconverting and downconverting content into the preferred output format of the user equipment 300, in some embodiments. Circuitry 304 may also include digital-to-analog converter circuitry and analog-to-digital converter circuitry for converting between digital and analog signals. The video generating circuitry may be used for presenting media content, in some embodiments. The tuning and encoding circuitry may be used by the user equipment device to receive and to display, to play, or to record content, in some embodiments. The tuning and encoding circuitry may also be used to receive guidance data, in some embodiments. The circuitry described herein, including for example, the tuning, video generating, encoding, decoding, encrypting, decrypting, scaler, and analog/digital circuitry, may be implemented using software running on one or more general purpose or special purpose hardware processors, in some embodiments. Multiple tuners may be provided to handle simultaneous tuning functions (e.g., watch and record functions, picture-in-picture (PIP) functions, multiple-tuner recording, etc.), in some embodiments. If storage 308 is provided as a separate device from user equipment 300, the tuning and encoding circuitry (including multiple tuners) may be associated with storage 308, in some embodiments.

A user may send instructions to control circuitry 304 using user input interface 310, in some embodiments. User input interface 310 may be any suitable user interface, such as a remote control, mouse, trackball, keypad, keyboard, touch screen, touchpad, stylus input, joystick, voice recognition interface, or other user input interfaces, in some embodiments.

Display 312 may be provided as a stand-alone device or integrated with other elements of user equipment device 300, in some embodiments. Display 312 may be one or more of a monitor, a television, a liquid crystal display (LCD) for a mobile device, or any other suitable equipment for displaying visual images, in some embodiments. In some embodiments, display 312 may be HDTV-capable. In some embodiments, display 312 may be a 3D display.

A video card or graphics card may generate the output to display 312, in some embodiments. The video card may offer various functions such as accelerated rendering of 3D scenes and 2D graphics, MPEG-2/MPEG-4 decoding, TV output, or the ability to connect multiple monitors, in some embodiments. The video card may be any processing circuitry described above in relation to control circuitry 304, in some embodiments. The video card may be integrated with the control circuitry 304 or may be integrated with display 312, in some embodiments.

Speakers 314 may be provided as integrated with other elements of user equipment device 300 or may be stand-alone units, in some embodiments. The audio component of media content displayed on display 312 may be played through speakers 314, in some embodiments. In some embodiments, the audio may be distributed to a receiver (not shown), which processes and outputs the audio via speakers 314.

I/O interface 316 can be any suitable I/O interface 316 in some embodiments. For example, in some embodiments, I/O interface 316 can be any suitable interface for coupling control circuitry 304 (and specifically processing circuitry 306) to one or more communications paths (e.g., paths 208, 210, and 212 described in FIG. 2). More particularly, for example, I/O interface 316 can include a cable modem, an integrated services digital network (ISDN) modem, a digital subscriber line (DSL) modem, a telephone modem, an Ethernet card, a fiber-optic modem, a wireless modem, and/or any other suitable communications circuitry. In some embodiments, the I/O interface can be used to provide content and data from an external location to device 300. For example, in some embodiments, I/O interface 316 can be used to provide media content (e.g., broadcast programming, on-demand programming, Internet content, content available over a local area network (LAN) or wide area network (WAN), and/or any other suitable content), media guidance data, subtitles, time codes, and/or any other suitable information or data to control circuitry 304 of device 300. In some embodiments, I/O interface 316 can also be used to send and receive commands, requests, and other suitable data from and to, respectively, control circuitry 304. Any suitable number of I/O interfaces 316 can be provided, even though only one is shown in FIG. 3 to avoid overcomplicating the drawing.

The processes for playing back media content, the interactive media guidance application and/or any other suitable functions as described herein may be implemented as stand-alone applications on user equipment devices in some embodiments. For example, the processes for playing back media content and/or the interactive media guidance application may be implemented as software or a set of executable instructions which may be stored in storage 308, and executed by control circuitry 304 of a user equipment device 300.

In some embodiments, the processes for playing back media content, the interactive media guidance application, and/or any other suitable functions as described herein may be implemented as client-server applications. In such client-server applications, a client application may reside on a user equipment device, and a server application may reside on a remote server, such as source 216. For example, the processes for playing back media content may be implemented partially as a client application on control circuitry 304 of user equipment device 300 and partially as a server application on media content source 216. As another example, an interactive media guidance application may be implemented partially as a client application on control circuitry 304 of user equipment device 300 and partially on a remote server (e.g., media guidance data source 218 of FIG. 2) as a server application running on control circuitry of the remote server.

Figure 4:
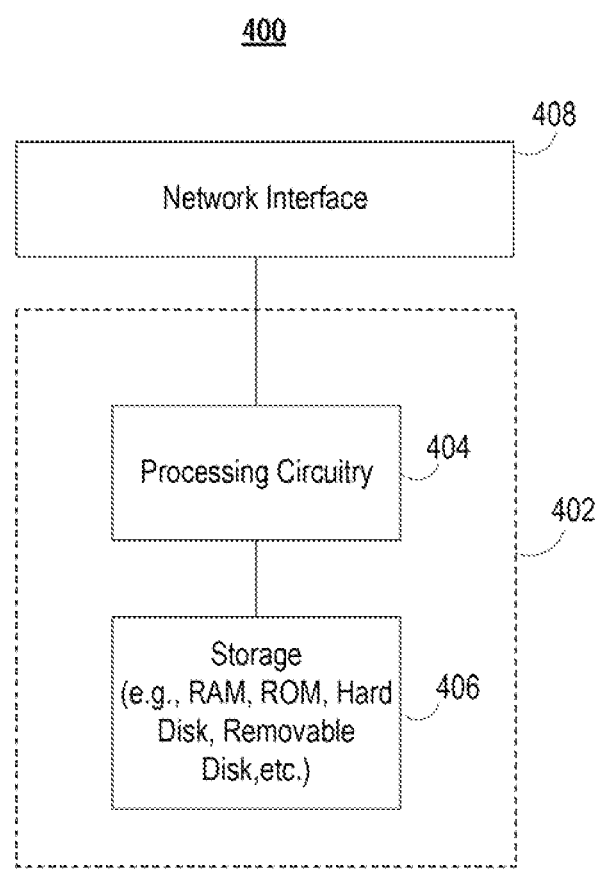
FIG. 4 shows an example of a block diagram of server hardware that can be used in accordance with some embodiments of the invention.

FIG. 4 shows an example of hardware that can be provided in an illustrative server 400. Server 400 may be part of a media content source, such as media content source 216, and it may implement a media content delivery process, such as content delivery process 236. As illustrated, server 400 can include control circuitry 402 (which can include processing circuitry 404 and storage 406) and a network interface 408.

Control circuitry 402 may include any suitable processing circuitry such as processing circuitry 404. As referred to herein, processing circuitry 404 can be circuitry that includes one or more microprocessors, microcontrollers, digital signal processors, programmable logic devices, field-programmable gate arrays (FPGAs), application-specific integrated circuits (ASICs), hardware processors, etc., and may include a multi-core processor (e.g., dual-core, quad-core, hexa-core, or any suitable number of cores) or a supercomputer, in some embodiments. In some embodiments, processing circuitry may be distributed across multiple separate processors or processing units, such as, for example, multiple of the same type of processing units (e.g., two Intel Core i7 processors) or multiple different processors (e.g., an Intel Core i5 processor and an Intel Core i7 processor).

Storage 406 can be any suitable digital storage mechanism in some embodiments. For example, storage 406 can include any device for storing electronic data, program instructions, computer software, firmware, register values, etc., such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 406 may be used to store media content, media guidance data, executable instructions (e.g., programs, software, scripts, etc.) for providing an interactive media guidance application, and for any other suitable functions, and/or any other suitable data or program code, in accordance with some embodiments. Nonvolatile memory may also be used (e.g., to launch a boot-up routine and other instructions). Cloud-based storage may be used to supplement storage 406 or instead of storage 406 in some embodiments.

Control circuitry 402 may include encoding circuitry for encoding media content (e.g., video or audio). Control circuitry 402 may also include adaptive bit streaming circuitry for encoding the media content into multiple bit rates and performing switches between the streams during normal playback based upon the streaming conditions. Control circuitry 402 may also include streaming circuitry for transmitting the different bit streams via network interface 408.

For example, in some embodiments, interface 408 can be any suitable interface for coupling control circuitry 402 (and specifically processing circuitry 404) to one or more communications networks. More particularly, for example, interface 408 can include a cable modem, an integrated services digital network (ISDN) modem, a digital subscriber line (DSL) modem, a telephone modem, an Ethernet card, a fiber-optic modem, a wireless modem, and/or any other suitable communications circuitry. In some embodiments, the I/O interface can be used by server 400 to stream content to a client device, such as device 300. More particularly, in some embodiments, interface 408 can be used to provide media content (e.g., broadcast programming, on-demand programming, Internet content, content available over a local area network (LAN) or wide area network (WAN), and/or any other suitable content). In some embodiments, interface 408 can also be used to receive commands, requests, from a client device. Such requests may be for blocks (e.g., chunks) of media content that is being streamed.

Figure 5A:
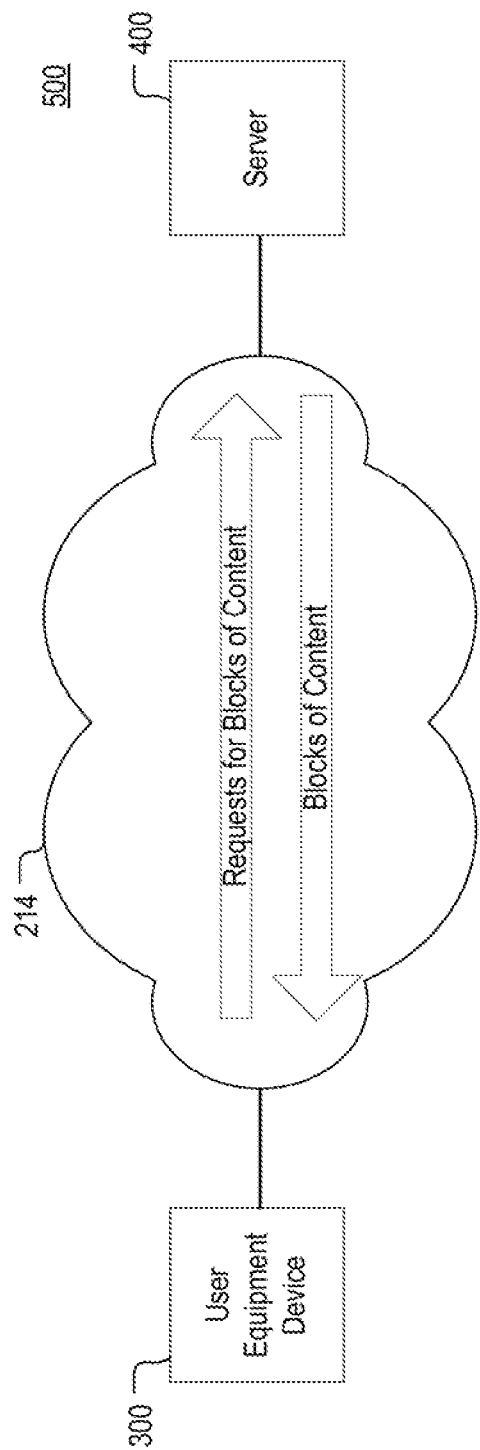
FIG. 5A shows an example of a block diagram of a system for streaming of content over a communications network in accordance with some embodiments of the invention.

FIG. 5A depicts an example of a system 500 that is operable to stream content from server 400 to device 300. In this example, a connection is established between device 300 and server 400 over a communications network (e.g., communications network 214) and used to stream content from the server to device 300. The connection may be based on any suitable Open Systems Interconnect (OSI) application-layer protocol, such as HTTP 1.1. Furthermore, the streamed content may be encoded using any suitable encoding scheme, such as MPEG.

In operation, device 300 may transmit to server 400 requests for blocks of the content that is being streamed. Each request may be for a different block of the content. Each block of the content may be a fragment of a larger content file (e.g., a video file or an audio file) that is stored on the server. Furthermore, each block of content may have a size (e.g., 2 MB) and be associated with a bit rate (e.g., compression level) at which the content is encoded. The size and the content may be varied by device 300, in some embodiments. In some embodiments, each block may carry several seconds (e.g. two (2) seconds) of playable content (e.g., video or audio).

In operation, server 400 may receive requests for blocks of content from a number of devices, including device 300. Depending on the time it takes a message to travel from the client to the server over the network and on the rate at which requests from various devices are arriving at the server, there might be a considerable delay between server 400 receiving a request for a block of content from device 300 and server 400 transmitting a response back to device 300 and when the client receives the response The larger the delay, the greater the latency of the connection between server 400 and device 300.

When requested blocks of content arrive at device 300, they may be stored in a memory buffer. The memory buffer may reside on device 300 or elsewhere. The memory buffer may be implemented as a first-in-first-out (FIFO) structure from which blocks of content are removed in the order of their arrival, decoded, and output for presentation to a user (e.g., via a display screen or a speaker). In order to ensure uninterrupted streaming of the content, blocks of the content should arrive in the buffer at a rate that is the same or greater than the rate at which the blocks are removed from the buffer. The rate at which the blocks are removed (e.g., the consumption rate of the content) relates to the presentation rate.

The connection between server 400 and device 300 must have sufficient small latency and sufficiently high bandwidth in order to ensure a proper quality of the streaming. The latency of the connection, in some embodiments, may be equal to the time differential between the transmission of a request for a block of content by the client device to server 400 and the receipt of the first network packet associated with the block of content at device 300. The bandwidth of the connection, in some embodiments, may be equal to the size of the block divided by the time differential between the receipt of the first and last network packet associated with a block of content The bandwidth of the connection may thus be based solely on the state of the network components (e.g., switches and bridges) that form the communications path(s), whereas the latency may also account for any delay in the serving of the requests that is attributable to server 400 and the network path chosen to deliver the content.

To increase the rate at which the connection is utilized, device 300 may use a technique herein referred to as pipelining. In some cases, pipelining multiple requests leads to lowering buffering delays and hence faster startup times. In accordance with this technique, device 300 may issue multiple requests simultaneously, or nearly simultaneously, before waiting for receipt of responses to any of the requests. The pipelining technique may increase the utilization rate by overlapping latency with simultaneous data download (e.g., throughput) of the connection between server 400 and device 300.

Figure 5B:
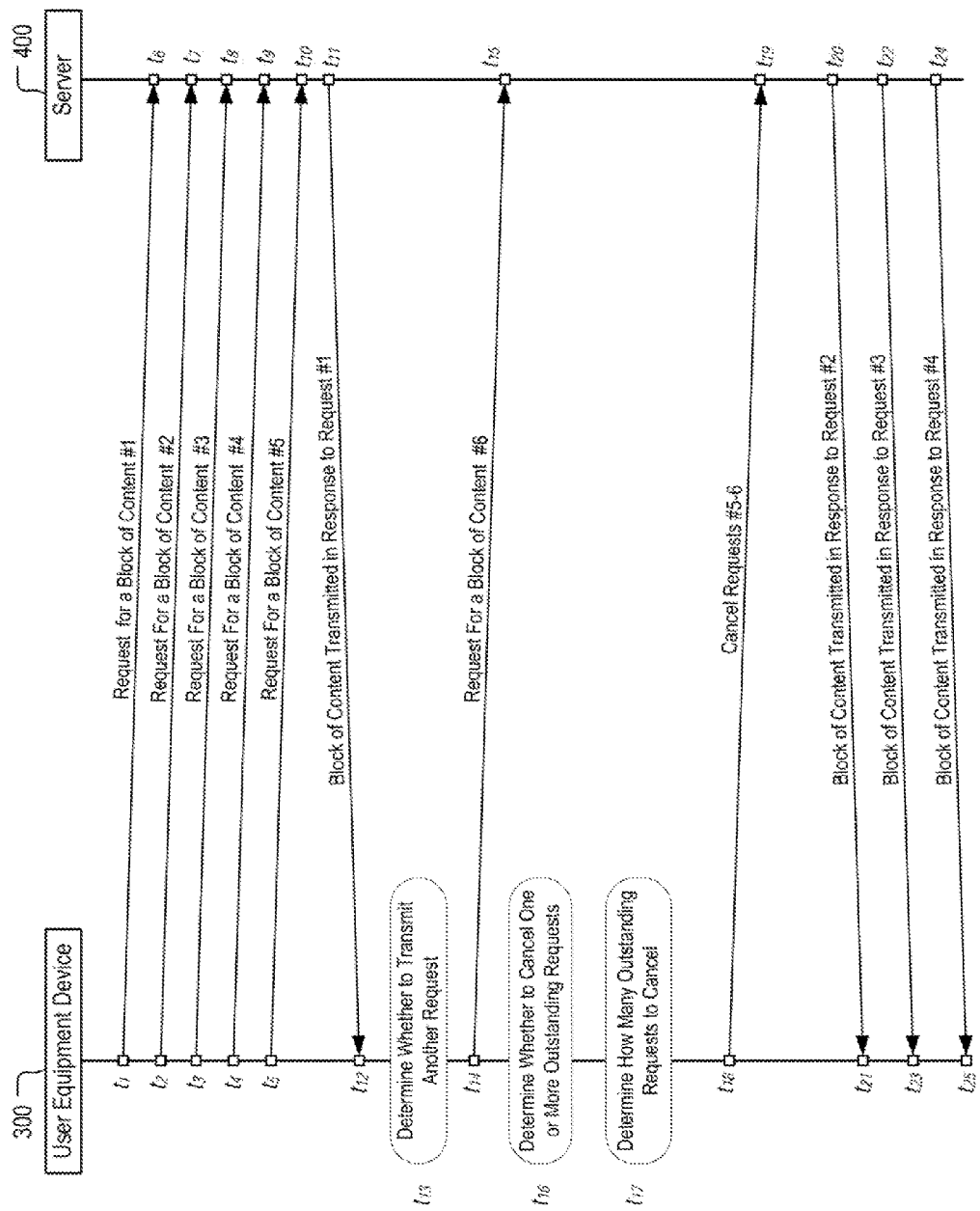
FIG. 5B shows an example of a sequence diagram of communications that take place between a user equipment device and a server in accordance with some embodiments of the invention.

FIG. 5B depicts a sequence diagram illustrating a set of interactions between device 300 and server 400 that may take place when pipelining is used. As illustrated, at times $t_1$-$t_5$, device 300 transmits Requests 1-5, respectively nearly simultaneously. Each one of the requests is for a different block of the content that is streamed. The requests are received at server 400 at times $t_6$-$t_{10}$, respectively. At time $t_{11}$, server 400 transmits a response to Request 1. As illustrated, the response may include multiple packets transmitted at times $t_{11a}$-$t_{11c}$, respectively. Each packet may carry a different portion of the request block of content. The first packet of the response (e.g., packet A) is received at device 300 at time $t_{12a}$ and the last packet from the response (e.g., packet C) is received at time $t_{12c}$. In view of the above, in this example, the latency of the connection between device 300 and server 400 is equal to the duration of the time period $t_1$-$t_{12a}$. The bandwidth of the connection, on the other hand, is based on the duration of the time period $t_{12c}$-$t_{12a}$.

At time $t_{13}$, device 300 can determine whether to increase the number of requests that are currently outstanding. In some embodiments, a request for a block of content may be considered outstanding if the request has been transmitted by device 300, but the requested block of content has not yet been received by device 300. In other embodiments, a request for a block of content may be considered outstanding if the request has been transmitted by device 300, but the block of content has not yet been transmitted by server 400. In this example, at time $t_{13}$, Requests 2-5 are currently outstanding.

In some embodiments, device 300 may determine a preferred number of outstanding requests based on one or more service characteristics of the connection between device 300 and server 400. If the preferred number is greater than the number of requests that are currently outstanding, device 300 may transmit one or more additional requests in order to reach the preferred number.

In some embodiments, the preferred number of outstanding requests may be determined as follows:

$$\text{preferred\_number\_of\_requests} = \left\lceil \frac{t_{latency}}{t_{transmission}} \right\rceil + 1 \quad \text{(Eq. 1)}$$

where, $t_{latency}$ is the latency (e.g., in seconds) of the connection between server 400 and device 300 and $t_{transmission}$ is the time that is expected to take for a block of the content to be carried from server 400 to device 300 by one or more communications path(s) connecting server 400 to device 300. In some embodiments, $t_{transmission}$ may be calculated as follows:

$$t_{transmission} = \frac{\text{block size}}{\text{bandwidth}} \quad \text{(Eq. 2)}$$

where, "block size" is the size of a requested block of the content (e.g., in Mbits) and bandwidth is the bandwidth of the connection—namely, the bandwidth, or expected bandwidth, of communications path(s) connecting device 300 to server 400 (e.g., in Mbits/sec). When the number of outstanding request is large enough, the server will continuously keep sending data to the client as there is always an outstanding (non-served) request available and the network is fully utilized.

It should be noted that any number of suitable criteria for determining the preferred number of outstanding requests may be used. For example, criteria that are similar to the policy rules R1-R9 discussed below may be used to determine the preferred number based on one or more of size of blocks that are being requested, number of requests that are currently outstanding, bit rate at which the content in the blocks is encoded, bandwidth of the communications link connecting device 300 to server 400, latency of the connection between device 300 and server 400, a calculation of the preferred number of requests and/or any other suitable criteria or criterion. In that regard, the disclosure is not limited to using Equation 1 to determine the preferred number of outstanding requests.

At time $t_{14}$, device 300 can determine that the preferred number of outstanding requests is greater than the number of requests that are currently outstanding and transmits Request 6 to server 400. In some embodiments, multiple requests may be sent at time $t_{14}$ in order to raise the total number of outstanding requests to the preferred number. In some embodiments, by increasing the number of outstanding requests, device 300 may fully utilize network 214. The request is received at the server at time $t_{15}$.

At time $t_{16}$, device 300 can determine whether to cancel any of the requests that are currently outstanding (e.g., Requests 2-6). By way of example, device 300 may cancel outstanding requests in response to the occurrence of one or more of the following events:

- E1: The bandwidth of a communications link connecting device 300 to server 400 increases.
- E2: The bandwidth of a communications link connecting device 300 to server 400 decreases.
- E3: The latency of the connection between device 300 and server 400 decreases.
- E4: The latency of the connection between device 300 and server 400 increases.
- E5: Signal strength associated with the connection between device 300 and server 400 increases.
- E6: Signal strength associated with the connection between device 300 and server 400 decreases.
- E7: An underflow condition occurs (e.g., see FIG. 6B).
- E8: The amount of data stored in a buffer of device 300 exceeds a threshold (e.g., see FIG. 6C).
- E9: User input is received at device 300 forcing it to request higher/lower encoding bit rate for the content.
- E10: Device 300 becomes unable to handle current encoding bit rate of the content (e.g., due to the device's processor slowing down).

Specifically, in some embodiments, device 300 may cancel outstanding requests when the bandwidth of the connection between device 300 and server 400 either increases or decreases. Cancelling outstanding requests when the amount of available bandwidth has increased may permit device 300 to issue new requests for blocks of the content that have a higher encoding bit rate. Similarly, cancelling outstanding requests when the amount of available bandwidth has decreased may permit device 300 to issue new requests for blocks of the content that have a lower encoding bit rate. In that regard, device 300 may cancel outstanding requests in order to increase the quality of the content's playback (when additional bandwidth becomes available) or maintain the playback uninterrupted when the amount of available bandwidth decreases Device 300, in some embodiments, may adapt to changing network conditions by keeping the number of outstanding requests as low as possible while still ensuring an appropriate utilization level for network 214, or network path connecting device 300 to server 400.

At time $t_{17}$, device 300 determines how many requests to cancel. The determination may be made in accordance with a policy rule. Examples of policy rules may include:

- R1: Determine a preferred number of outstanding requests (e.g., by using Equation 1) and reduce the number of request that are currently outstanding down to the preferred number.
- R2: For each X Mbits/sec increase in the bandwidth of the communications path(s) connecting device 300 to server 400, cancel one outstanding request.
- R3: For each X Mbits/sec decrease in the bandwidth of the communications path(s) connecting device 300 to server 400, cancel one outstanding request.
- R4: For each X sec increase in the amount of playable content stored in the buffer of device 300, cancel one outstanding request.
- R5: For each X Mbits increase in the amount of content stored in the buffer of device 300, cancel one outstanding request.
- R6: For each X Mbits of content stored in the buffer of device 300, cancel one outstanding request.
- R7: Reduce the amount of data that is requested by all outstanding requests to a predetermined quantity (e.g., 20 MB or 20 sec of playable content).
- R8: Cancel at least one outstanding request in response to detecting an underflow condition (e.g., see FIG. 6B).
- R9: Cancel all outstanding requests in response to detecting an underflow condition (e.g., see FIG. 6B).
- R10: Any combination of rules R1 through R9.

In some embodiments, the policy rule for cancelling one or more outstanding requests may be driven by at least two considerations that at are odds with one another. For example, it might be desirable for device 300 to switch to using a different encoding bit rate for the streamed content as soon as possible. Yet, it might also be desirable for device 300 to avoid a depletion of its buffer and disruptions in playback of the content over the course of switching to a different bit rate. To balance these considerations, as illustrated above, the policy rule for determining how many outstanding requests to cancel may be based on one or more of size of blocks that are being requested, number of requests that are currently outstanding, bit rate at which the content in the blocks is encoded, bandwidth of the communications link connecting device 300 to server 400, latency of the connection between device 300 and server 400, a calculation of the preferred number of requests, and/or any other suitable criteria or criterion.

At time $t_{18}$, device 300 may cancel one or more outstanding requests. The cancelation may be performed based on the number determined at time $t_{17}$. For example, if at time $t_{17}$ device 300 determines that two (2) requests need to be canceled, the device may cancel the two outstanding requests that were transmitted most recently (e.g., Requests 5-6).

In some embodiments, outstanding requests may be canceled by device 300 transmitting a cancellation notice that identifies one or more outstanding requests. Upon receiving such a notice, server 400 may cancel processing of the identified requests. As another example, in some embodiments, the cancellation may involve terminating the current communications session between device 300 and server 400, starting a new communications session, and re-issuing requests that were outstanding when the first session was canceled except for those requests that needed to be canceled. Terminating the current communications session may be utilized as a means for request cancelation in circumstances where the OSI application layer protocol used for the content streaming does not permit selective request cancelation. HTTP 1.1 is an example of one such protocol. It should be noted that in some embodiments, due to the time it may take to cancel requests and build up a new connection, request cancellation may need to be avoided as much as possible.

In this example, responses to the requests that remain outstanding after the cancellation is performed, namely Requests 2-4, are transmitted at times $t_{20a-c}$, $t_{22a-c}$, and $t_{24a-c}$, respectively. Those responses are received at client device 300 at times $t_{21a-c}$, $t_{23a-c}$, and $t_{25a-c}$, respectively.

Figure 6A:
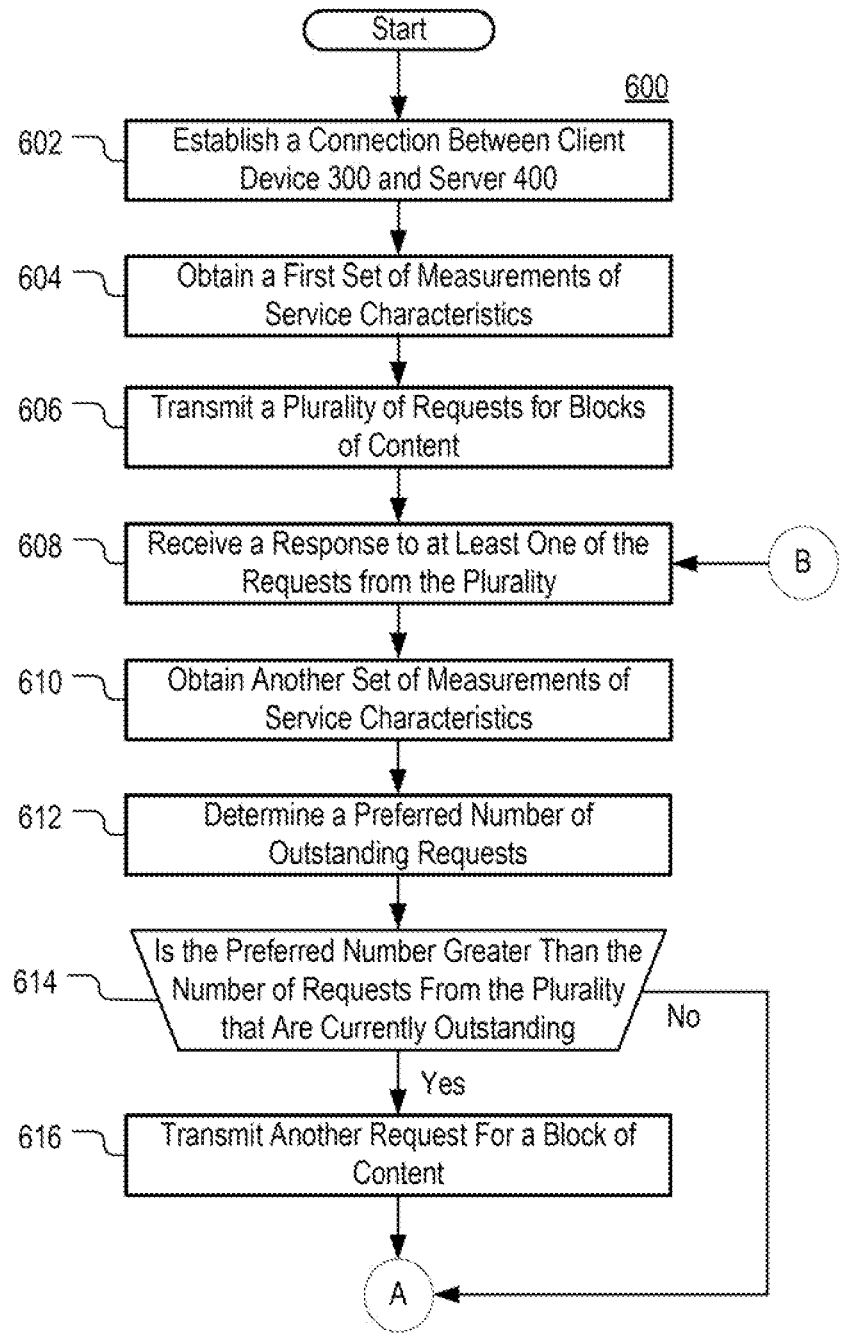
FIGS. 6A, 6B, and 6C show an example of a flow diagram of a first portion of a process for streaming of content, in accordance with some embodiments of the invention.
Figure 6B:
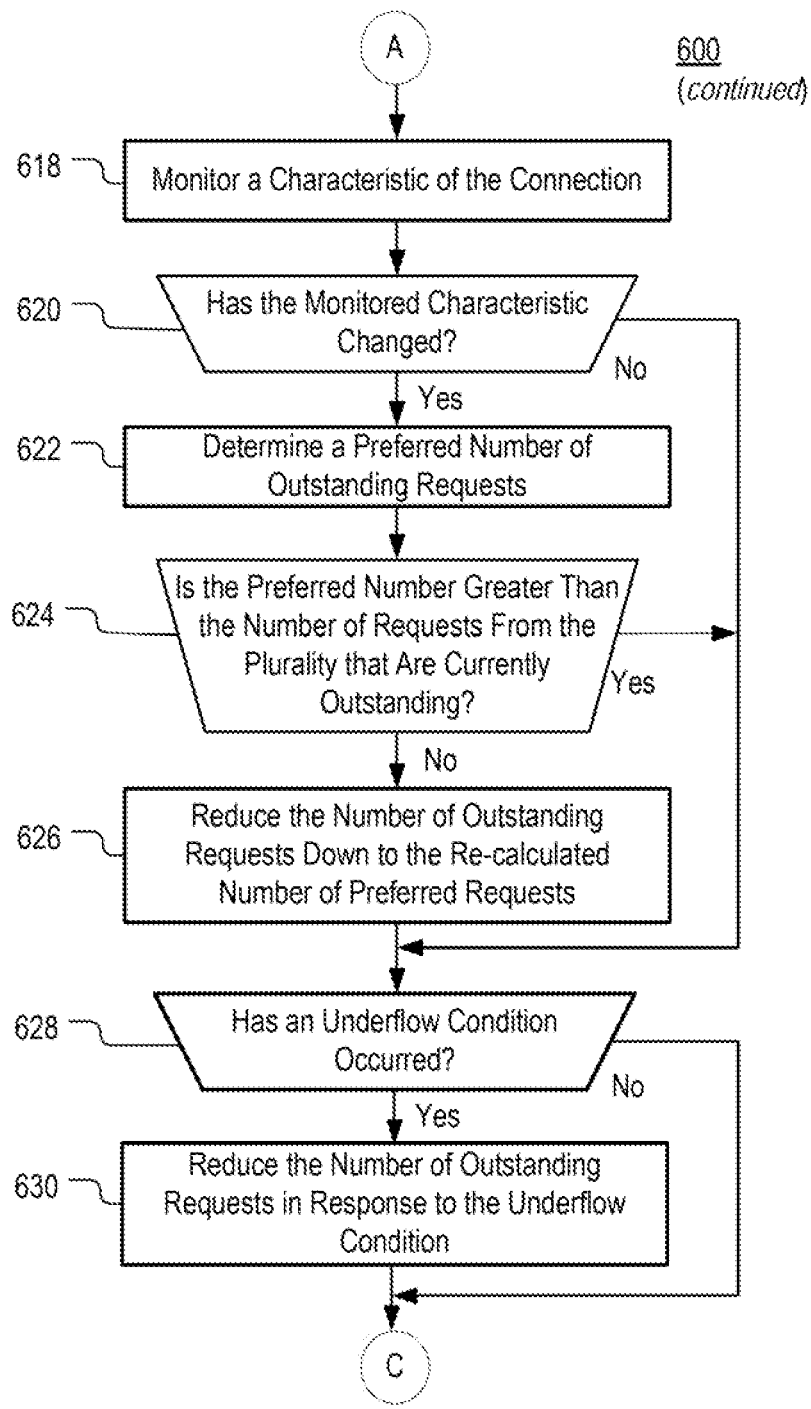
Figure 6C:
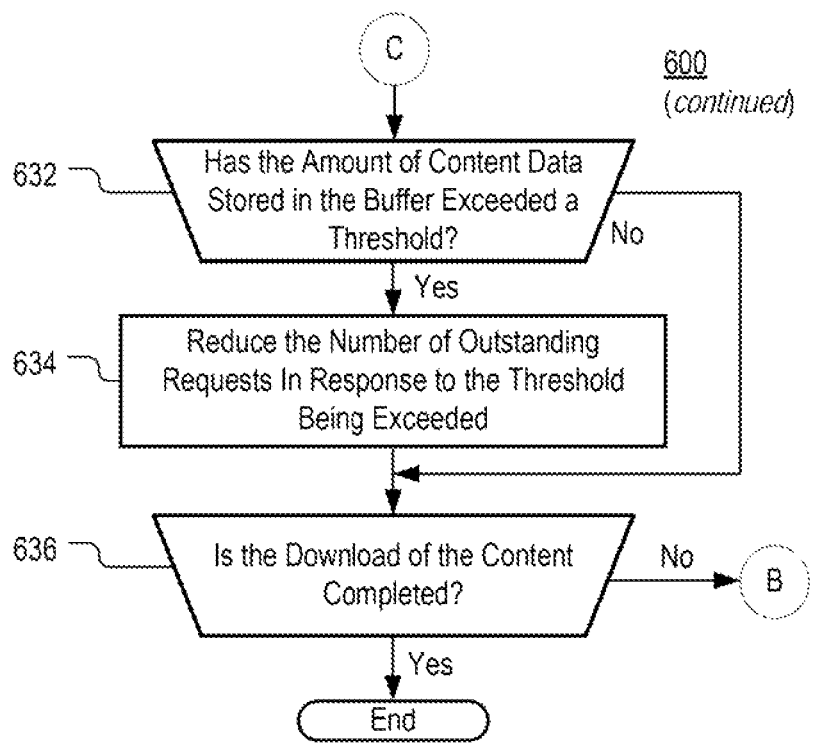

FIGS. 6A-C illustrate an example of a process 600 for transferring content between a server and a client device in accordance with some embodiments of the disclosure. At 602, a connection between device 300 and server 400 is established. At 604, a set of measurements of service characteristics of the connection between device 300 and server 400 is obtained. The set of measurements, in some embodiments, may include a single measurement of one service characteristic. In other embodiments, however, the set may include a plurality of measurements, each measurement of the plurality being one of a different characteristic. In this example, the set includes measurements of the bandwidth and latency of the connection between device 300 and server 400. In other examples however, the service characteristic(s) may be any characteristic(s) that is indicative of the bandwidth and/or latency of the connection between device 300 and server 400. For example, in some embodiments, the service characteristic(s) may include, signal strength of network connection of device 300, type of network access used by device 300 (e.g., a broadband network, a 3G network, of a 4G network), or any other suitable characteristic. Device 300 may alone take measurements of the monitored characteristic(s) or, additionally or alternatively, device 300 may obtain the measurements from another node (e.g., server 400 or a network switch on the path between server 400 or device 300).

At 606, device 300 transmits a plurality of requests. Each request in the plurality specifies a different block of the content that device 300 seeks to obtain. In some embodiments, the number of requests in the plurality may depend on the set of measurements obtained at 604. Moreover, in some embodiments, the number of requests in the plurality may be determined using Equation 1 and/or one or more rules for determining a preferred number of outstanding requests.

At 608, a response to a request from the plurality is received at device 300. At 610, device 300 obtains another set of measurements of the same service characteristics whose measurements are obtained at 604. At 612, device 300 calculates a preferred number of outstanding requests. For example, in some embodiments, the preferred number may be calculated using Equation 1. As another example, in some embodiments, the preferred number may be calculated using one or more rules for calculating preferred numbers. As yet another example, in some embodiments, the preferred number may be calculated based on how many blocks of the content remain to be requested before the download of the content is finished.

At 614, a determination is made whether the preferred number of requests is determined to be greater than the number of service requests that are currently outstanding. If the preferred number is greater, at 616, one or more requests for other blocks of the content are transmitted from device 300 to server 400. Otherwise, process 600 proceeds to step 618. In some embodiments, the preferred number of outstanding requests may be re-calculated dynamically every time a response to an outstanding request is received.

At 618, device 300 monitors a service characteristic of the connection. The service characteristic may be one or more of latency, bandwidth or another characteristic that is indicative of the bandwidth and/or latency of the connection between device 300 and server 400, such as throughput, signal strength of network connection of the device 300, type of network access used by device (e.g., broadband, 3G, 4G), the time to cancel a request, or another similar characteristic. Device 300 may alone take measurements of the monitored characteristic or, additionally or alternatively, it may obtain the measurements from another node (e.g., server 400 or a network switch on the path between server 400 or device 300).

At 620, device 300 determines whether the value of the service characteristic has changed. In some aspects, device 300 may determine whether the most recent measurement of the monitored characteristic is greater or less (e.g., by a predetermined threshold or absolutely) than a previous measurement of the same characteristic. For example, in some embodiments, device 300 may determine whether the bandwidth of the connection between device 300 and server 400 has increased. Upon a positive determination, the process proceeds to 622. Otherwise, the process proceeds to 628.

At 622, device 300 calculates a preferred number of outstanding requests. The preferred number may be determined in accordance with Equation 1 or one or more rules for determining preferred numbers. In some embodiments, the preferred number may be calculated based on how many blocks of the content of have not been requested yet, and need to be requested before the download of the content is finished. At 624, device 300 determines whether the preferred number of requests is smaller than the number of requests that are currently outstanding. If the preferred number of requests is greater than or equal to the number of requests that are currently outstanding, the process proceeds to 628. Otherwise, in instances where the preferred number is less than the number of requests that are currently outstanding, the process proceeds to 626.

At 626, device 330 reduces the number of requests down to the preferred number. In doing so, device 300 may cancel as many requests as is necessary in order to bring the total number of outstanding requests down to the preferred number.

At 628, device 300 determines whether an underflow condition has occurred. In some embodiments, an underflow condition may exist when portions of the content that are stored in a media buffer of device 300 are consumed at a faster rate by the device than the rate at which new portions of the content arrive at device 300. In some aspects, underflow conditions may be caused by a decrease of the bandwidth, or increase of the latency, of the connection between server 400 and device 300. In other aspects, underflow conditions may be caused by events that take place at device 300 that cause the media content stored in the buffer to be depleted faster than expected (e.g., the receipt of a fast-forwarding instruction from a user).

Underflow conditions, in some embodiments, may be detected based on one or more of, amount of content data stored in the buffer, bit rate at which the content in the buffer is encoded, bandwidth of the connection, latency of the connection, and/or any other suitable quality of service metric of the connection. In some embodiments, an underflow condition may be considered to exist when the following inequality is met:

$$\frac{\text{size data}}{\text{current rate}} \geq t_{video\ in\ buffer} - t_{delay} - t_{cancel\ request} - t_{safety\ margin} \quad \text{(Eq. 3)}$$

where "current rate" is the bandwidth of the connection between server 400 and device 300, "size data" is the sum of the sizes of all blocks that have been requested by the requests that are currently outstanding, $t_{video\ in\ buffer}$ is the total play time of all blocks of the content that are stored in the buffer, $t_{delay}$ is a minimum playtime of content data that needs to be stored in the buffer of device 300 in order to prevent an underflow, $t_{cancel\ request}$ is an estimate of the time it takes the device 300 to cancel a request, and $t_{safety\ margin}$ may be an additional safety margin that can be specified by an administrator. In some embodiments, $t_{delay}$ may be set to equal between two (2) seconds and eight (8) seconds, or any other suitable variable. Furthermore, in some embodiments, $t_{cancel\ request}$ may be determined experimentally.

If an underflow condition is determined to have occurred, process 600 proceeds to 630. Otherwise, process 600 proceeds to 632. At 630, device 300 reduces the number requests from the plurality that are still outstanding down to the preferred number. In doing so, device 300 may cancel one or more of the outstanding requests. In some embodiments, the number of requests that are canceled may be determined in accordance with any one of the policy rules discussed with respect to FIG. 5B. Furthermore, in some embodiments, device 300 may maximize user experience by preventing underflow as much as possible by keeping the number of outstanding requests as low as possible and cancelling outstanding requests only when absolutely necessary. In general, underflow may be prevented by canceling at least some outstanding requests when an underflow condition is detected and switching to a lower encoding bit-rate. In some embodiments, the switching may entail transmitting new requests for blocks of content and specifying a lower bit-rate at which the content is to be encoded. The lower encoding bit-rate may be specified inside the new requests or in a separate message.

Furthermore, in some embodiments, whether an underflow condition exists may be determined with respect to an individual request for a block of content. In some of these embodiments, the value of $t_{video\ in\ buffer}$ may be based, at least partially, on the size, or playback duration, of one or more blocks of content that have been requested before the individual request is transmitted, but are yet to be downloaded at device 300. As can be readily appreciated, each downloaded block of content will increase the amount of content in the buffer, if it arrives before the buffer is depleted. Moreover, in some of these embodiments, the value of $t_{video\ in\ buffer}$ may be based on an estimate of the time it would take to download, at device 300, a block of content that is requested by one of the preceding requests in order to account for the fact that the content in the buffer is depleted while the block is being downloaded. Notably, whether an underflow condition exists may be determined with respect to each individual outstanding request in order to determine whether to cancel this request. This iterative approach may be more accurate and it may prevent unnecessary cancellations.

At 632, device 300 determines whether the amount of data stored in the buffer exceeds a predetermined threshold. If the amount of data is less than or equal to the threshold, the process proceeds to 636. Otherwise, the process proceeds to 634. At 634, in response to detecting that the threshold is exceeded, device 300 reduces the number of outstanding requests down to the preferred number. In doing so, device 300 may cancel one or more of the outstanding requests. In some embodiments, the number of requests that are canceled may be determined in accordance with any one of the policy rules discussed with respect to FIG. 5B.

At 636, device 300 determines whether the download of the content is completed. The download of the content is completed when the last block of the content has been received. If the download is completed, process 600 ends. Otherwise, the process returns to 608.

Although in the above example the tasks of process 600 are performed by device 300, or processing circuitry of device 300, in other examples one or more of the steps may be performed by server 400, or processing circuitry of 404 of server 400. It is to be understood that in such embodiments steps that are not performed by server 400 may still be performed by client device 300.

For instance, server 400, in some embodiments, may obtain the first set of measurements of service characteristics. By way of example, server 400, in some embodiments, may determine, at 604, the number of requests in the plurality, and communicate that number to device 300. Server 400, in some embodiments, may determine, at 608, the other set of measurements of service characteristics. Server 400, in some embodiments, may similarly determine the preferred number of outstanding requests. By way of example, server 400 may communicate, at 612, the determined number to device 300.

Server 400, in some embodiments, may determine whether the preferred number is greater than the number of requests that are currently outstanding. Server 400, in some embodiments, may monitor, at 618, a characteristic of the connection. Server 400, in some embodiments, may determine, at 620, whether the monitored characteristic has changed. Server 400, in some embodiments, may calculate, at 622, the preferred number of outstanding requests. Server 400, in some embodiments, may determine, at 624, whether the preferred number is greater than the requests that are currently outstanding. Server 400, in some embodiments, may reduce, at 626, the number of outstanding requests if the preferred number is less than the number of requests that are currently outstanding (e.g., by removing requests from the waiting queue of the server). Server 400, in some embodiments, may determine, at 628, whether an underflow condition has occurred. Server 400, in some embodiments, may reduce, at 630, the number of outstanding requests in response to detecting the underflow condition.

Furthermore, in some embodiments, one or more of the tasks in process 600 that are not performed by server 400 or device 300 may be performed by another device that is part of network 214. In that regards, it is to be understood that the technique disclosed with respect to FIGS. 6A-C may be performed by any combination of network nodes.

Furthermore, it should be understood that the above steps of the flow diagrams of FIGS. 6A-B may be executed or performed in any order or sequence not limited to the order and sequence shown and described in the figures. Furthermore, it should be understood, some of the above steps of the flow diagrams of FIGS. 6A-C may be executed or performed substantially simultaneously where appropriate or in parallel to reduce latency and processing times. And still furthermore, it should be understood, some of the above steps of the flow diagrams of FIGS. 6A-C may be omitted. Although the above embodiments of the invention are described in reference to content streaming, it is to be understood that the techniques disclosed herein may be used in any type of data downloading, including downloading of content that is not rendered (or played) while the download is taking place.

In some embodiments, any suitable computer readable media can be used for storing instructions for performing the mechanisms and/or processes described herein. For example, in some embodiments, computer readable media can be transitory or non-transitory. For example, non-transitory computer readable media can include media such as magnetic media (such as hard disks, floppy disks, etc.), optical, media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

The above described embodiments of the present disclosure are presented for purposes of illustration and not of limitation, and the present disclosure is limited only by the claims which follow.

What is claimed is:

1. A system for presenting media content using cached assets, the system comprising:
processing circuitry configured to:
transmit to a server via a connection a plurality of requests for blocks of a content, the plurality including a first request for a first block of the content and a second request for a second block of the content, where the connection with the server is established over one or more communications networks and comprises:
a bandwidth; and
a latency;
wherein the latency is based on a time taken for the server to process and respond to a given request for a block of content;
while the second request is still outstanding:
receive the first block of the content responsive to the first request;
determine a preferred number of outstanding requests, where the preferred number of outstanding requests is determined based on both the latency and the bandwidth of the connection and is evaluated using the following expressions:

$$\text{preferred number of requests} = \left\lfloor \frac{t_{latency}}{t_{transmission}} \right\rfloor + 1$$

$$t_{transmission} = \frac{\text{block size}}{\text{bandwidth}}$$

where $t_{latency}$ is the latency, $t_{transmission}$ is the time for the block of content to be transmitted to the server, block size is the size of a request for the block of content, and bandwidth is the bandwidth; and
when the preferred number of outstanding requests is greater than the number of requests from the plurality that are currently outstanding, transmit a third request for a third block before the second block is received by the processing circuitry;
when the preferred number of outstanding requests is less than or equal to the number of requests from the plurality that are currently outstanding, transmit the third request after the second block is received by the processing circuitry.

2. The system of claim 1, wherein:
the first request, the second request, and the third request are transmitted using an Open Systems Interconnect (OSI) application-layer protocol.

3. A method for controlling delivery of content, comprising:
transmitting, by a device to a server via a connection, a plurality of requests for blocks of a content, the plurality including a first request for a first block of the content and a second request for a second block of the content, where the connection with the server is established over one or more communication networks and comprises:
a bandwidth; and
a latency;
wherein the latency is based on a time taken for the server to process and respond to a given request for a block of content;
while the second request is still outstanding:
receiving the first block of the content responsive to the first request;
determining a preferred number of outstanding requests, where the preferred number of outstanding requests is determined based on both the latency and the bandwidth of the connection and is evaluated using the following expressions:

$$\text{preferred number of requests} = \left\lfloor \frac{t_{latency}}{t_{transmission}} \right\rfloor + 1$$

$$t_{transmission} = \frac{\text{block size}}{\text{bandwidth}}$$

where $t_{latency}$ is the latency, $t_{transmission}$ is the time for the block of content to be transmitted to the server, block size is the size of a request for the block of content, and bandwidth is the bandwidth; and
when the preferred number of outstanding requests is greater than the number of requests from the plurality that are currently outstanding, transmitting a third request for a third block of the content before the second block is received at the device;
when the preferred number of outstanding requests is less than or equal to the number of requests from the plurality that are currently outstanding, transmitting the third request after the second block is received at the device.

4. The method of claim 3, wherein the first request, the second request, and the third request are transmitted using an Open Systems Interconnect (OSI) application-layer protocol.

5. A non-transitory computer-readable medium containing computer-executable instructions that, when executed by a processing circuitry, cause the processing circuitry to perform a method for controlling delivery of content, the method comprising:
transmitting to a server via a connection a plurality of requests for blocks of a content, the plurality including a first request for a first block of the content and a second request for a second block of the content, where the connection with the server is established over one or more communications network and comprises:
a bandwidth; and
a latency;
wherein the latency is based on a time taken for the server to process and respond to a given request for a block of content;
while the second request is still outstanding, receiving the first block of the content responsive to the first request;
determining a preferred number of outstanding requests, where the preferred number of outstanding requests is determined based on both the latency and the bandwidth of the connection and is evaluated using the following expressions:

$$\text{preferred number of requests} = \left\lfloor \frac{t_{latency}}{t_{transmission}} \right\rfloor + 1$$

$$t_{transmission} = \frac{\text{block size}}{\text{bandwidth}}$$

where $t_{latency}$ is the latency, $t_{transmission}$ is the time for the block of content to be transmitted to the server, block size is the size of a request for the block of content, and bandwidth is the bandwidth; and when the preferred number of outstanding requests is greater than the number of requests from the plurality that are currently outstanding, transmitting a third request for a third block of the content before the second block is received by the processing circuitry;

when the preferred number of outstanding requests is less than or equal to the number of requests from the plurality that are currently outstanding, transmitting the third request after the second block is received by the processing circuitry.

6. The non-transitory computer readable medium of claim 5, wherein the first request, the second request, and the third request are transmitted using an Open Systems Interconnect (OSI) application-layer protocol.

* * * * *